Nov. 3, 1964  P. E. FISCHER ETAL  3,155,379
PRE-EXPANDER FOR PELLETS OF PLASTIC MATERIAL
Filed Jan. 29, 1962  3 Sheets-Sheet 1
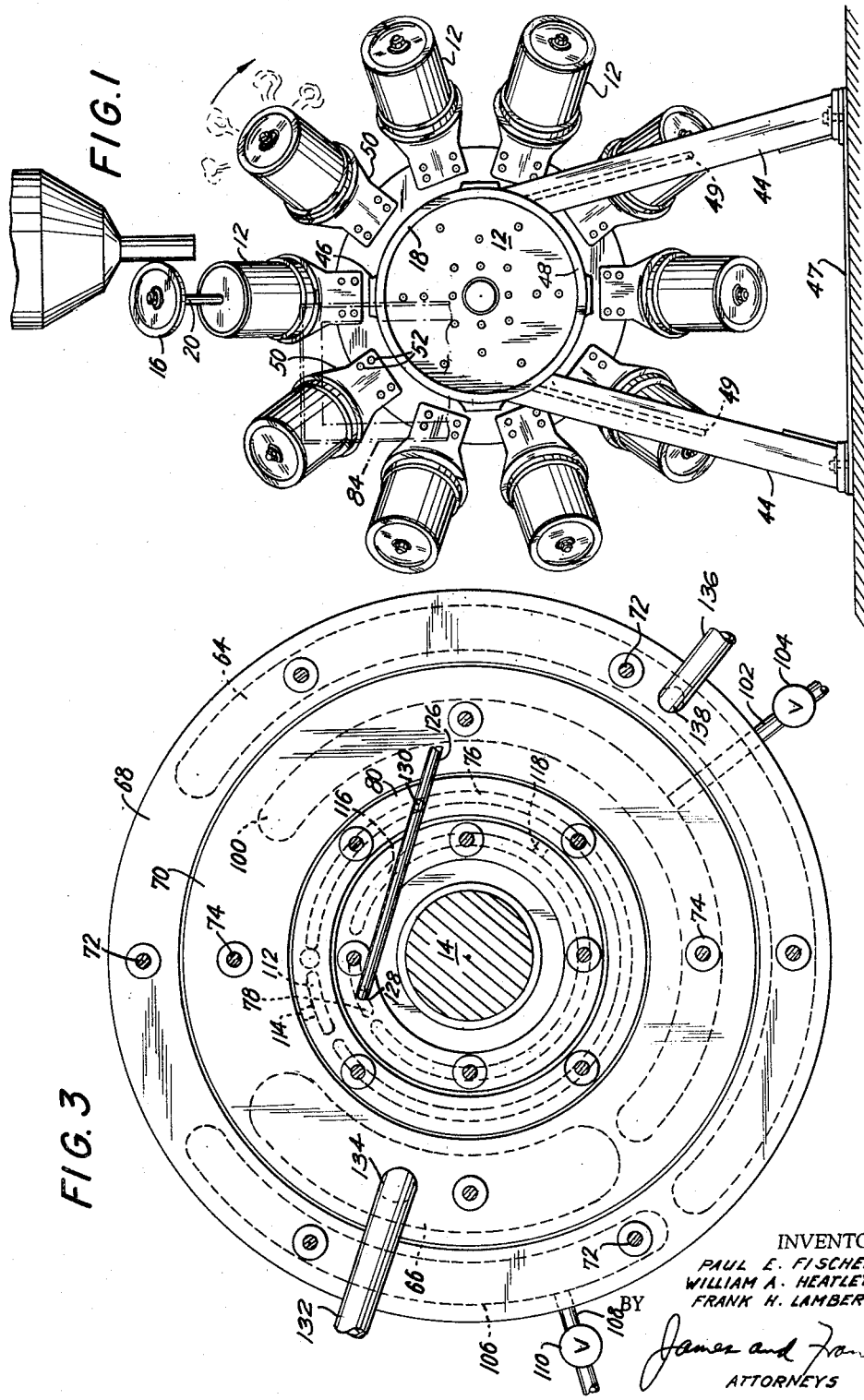
INVENTORS
PAUL E. FISCHER
WILLIAM A. HEATLEY, Jr.
FRANK H. LAMBERT
BY
James and Franklin
ATTORNEYS

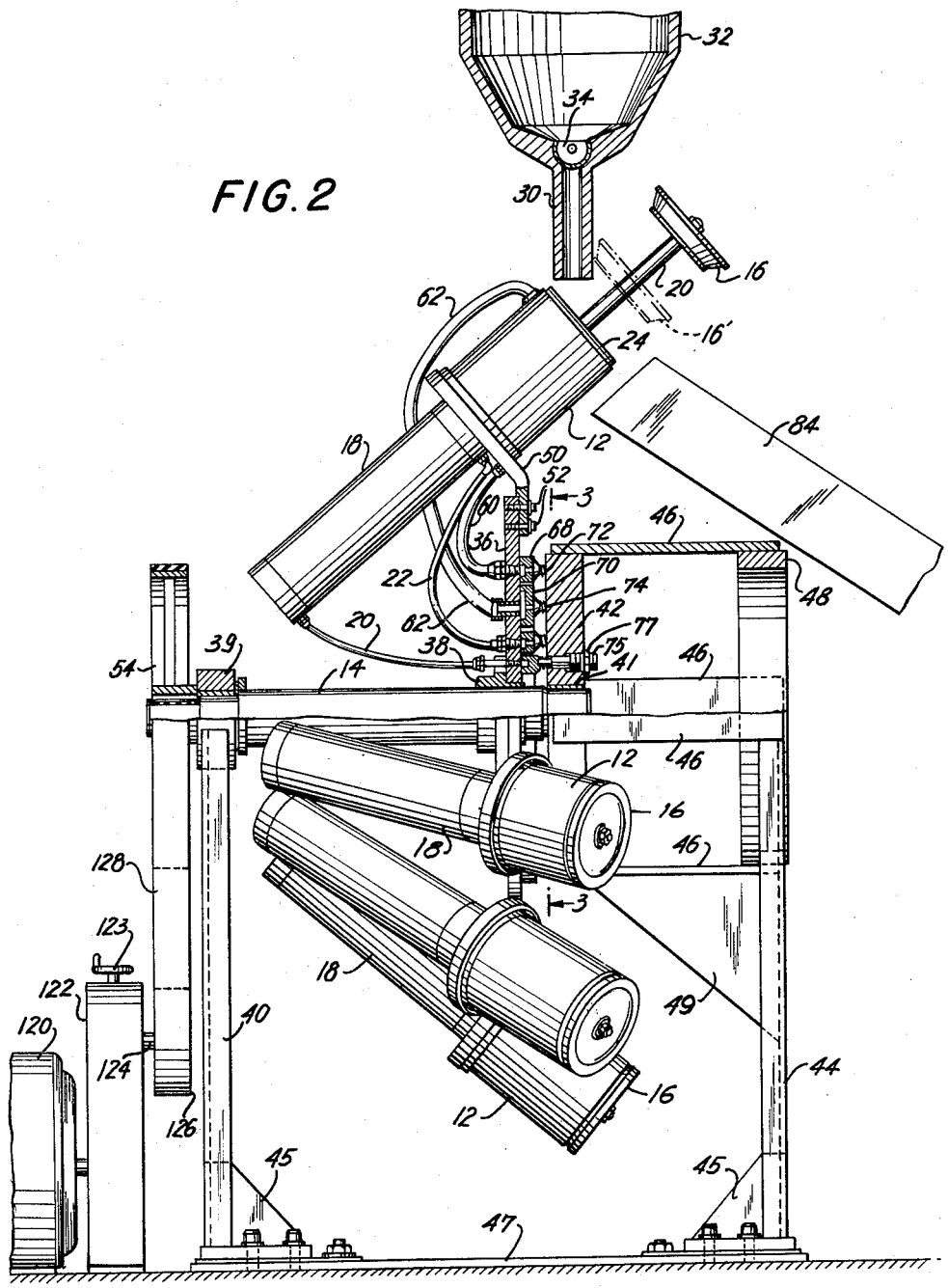

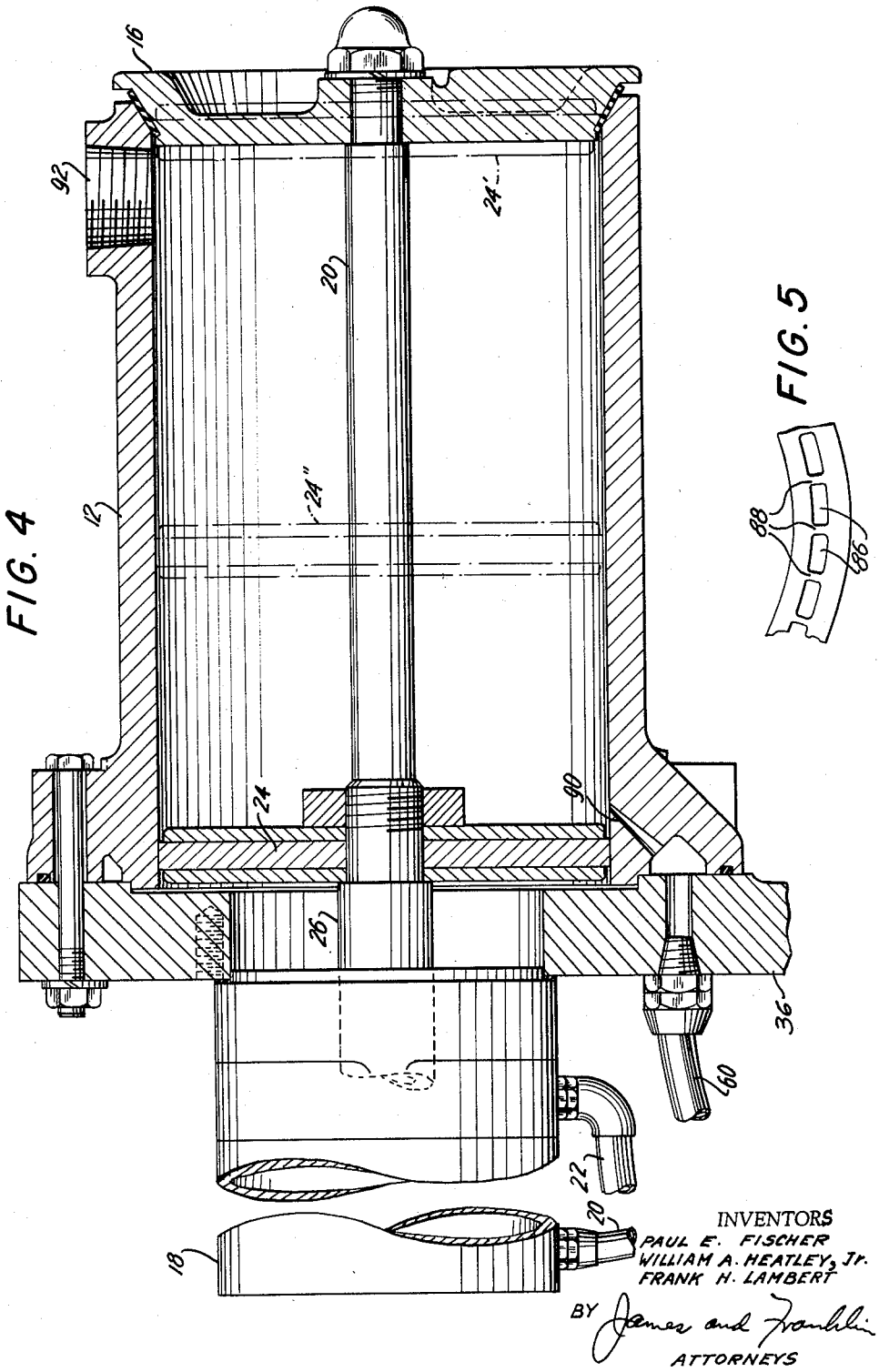

United States Patent Office

3,155,379
Patented Nov. 3, 1964

3,155,379
PRE-EXPANDER FOR PELLETS OF PLASTIC MATERIAL
Paul E. Fischer, Cedar Grove, William A. Heatley, Jr., North Haledon, and Frank H. Lambert, Pompton Lakes, N.J., assignors to Champlain-Zapata Plastics Machinery, Inc., Caldwell, N.J., a corporation of Delaware
Filed Jan. 29, 1962, Ser. No. 169,411
17 Claims. (Cl. 263—21)

This invention relates to foam molding, and more particularly to pre-expanders.

In foam molding, pellets of plastic material (typically polystyrene) are employed, the material having previously been charged with a propellant gas. When such pellets are heated and softened, the expansion of the propellant gas blows each pellet into a much larger and very lightweight bead. These beads are preliminarily formed in a pre-expander, and subsequently are conveyed to a mold to fill the same. They are further heated in the mold to cause them to fuse or coalesce, and to provide a smooth skin for the molded article. The mold then is chilled and the somewhat hardened product is removed from the mold.

The general object of the present invention is to improve pre-expanders for the described purpose. A more specific object is to provide a pre-expander the operation of which is nearly continuous. A further object is to discourage sticking of the beads in the pre-expander by giving the beads a moderate amount of tumbling action. These objects are fulfilled by the provision of a turret of pre-expansion chambers which operate in continuous succession.

Another object of the invention is to insure complete emptying of the chambers. A still further object is to discourage sticking of the beads during subsequent transfer to the mold. Still another object is to provide for the direct admission of steam to expand the pellets, followed by treatment with hot air to dry the same. An ancillary object is to control the steam and air for either a static treatment, or a flow-through treatment, or both.

Another object is to so dispose the chambers and turret as to provide a favorable position to readily empty the chambers and to load the same wtih a new charge of unexpanded pellets.

To accomplish the foregoing general objects, and other more specific objects which will hereinafter appear, the invention resides in the pre-expander elements and their relation one to another, as are hereinafter more particularly described in the following specification. The specification is accompanied by drawings in which:

FIG. 1 is a front elevation of a pre-expander embodying features of the invention;

FIG. 2 is a partially sectioned side elevation of the same;

FIG. 3 is a section taken approximately in the plane of the line 3—3 of FIG. 2, drawn to larger scale;

FIG. 4 is a longitudinal section through one of the pre-expansion chambers drawn to enlarged scale; and FIG. 5 is explanatory of a detail.

Referring to the drawing, and more particularly to FIGS. 1 and 2, the pre-expander comprises a rotatable turret of treatment chambers 12. The chambers are cylinders which preferably are disposed in frusto-conical relation, and the turret preferably is rotatable on a horizontal axis or turret shaft indicated at 14. Each of the cylinders is open at its outer or forward end, and is provided with an openable closure 16.

Each cylinder is operated by an actuator 18 having a rod 20 connected to the closure, the said actuator being at that end of the cylinder which is nearer the apex of the conical turret. In the present case the actuator is an air cylinder controlled by air supplied through pipes 20 and 22, and there are such pipes for each cylinder. In the particular case here shown there are ten cylinders, but a different number may be used.

Referring now to FIG. 4 of the drawing, the pre-expansion chamber or cylinder 12 and its closure 16 are those previously described. In addition, FIG. 4 shows a piston 24 which is slidable in the cylinder and which acts as a bottom for the same. The actuator 18 is itself an air cylinder carrying a piston which is not shown. However, the piston rod is indicated at 26, and it is connected to the piston 24 in order to move the same between a retracted position for receiving and treating a charge of unexpanded pellets, and what may be termed a "protruded" position 24' in which the piston is moved all the way to the open end of the cylinder to insure complete discharge of the expanded beads from the cylinder.

The rod 20 connects the piston 24 and the closure 16 for movement in unison. This rod may be an extension of or a part of the actuator piston rod 26. The resulting piston and closure assembly preferably has three positions. An intermediate position of the piston is shown in broken lines at 24", at which time the closure 16 is correspondingly open, and the cylinder is in condition for receiving a charge of unexpanded pellets. Not much room is needed for these because the pellets are very small in volume prior to expansion.

The solid line position shown in FIG. 4 is the closed position in which the pellets are treated to expand the same. The fully protruded position of the closure 16 is shown in solid lines in FIG. 2, and the intermediate position is shown in broken lines at 16'. FIG. 2 also shows the convenient use of a filler spout 30 near the top of the turret, and this spout may itself be used to obstruct full closing of the closure 16. Spout 30 may be formed at the lower end of a hopper 32, and the hopper may be provided with a rotatable measuring cup 34 to measure the desired quantity of unexpanded pellets to be dropped into the cylinder 12.

The turret comprises a relatively large disc 36 rigidly mounted on a hub 38 which is secured to shaft 14. The latter is carried in a fixed bearing 39 on a rear pedestal 40. The forward bearing 41 is carried in a fixed circular mounting plate 42, which is preferably overhung from a forward pedestal 44, as by means of supports 46. These may be welded to an annular member 48 carried by pedestal legs 44, as is best shown in FIG. 1. The support of plate 42 may be aided by suitable angle plates 49 (FIG. 2), there being one of these on each of the pedestal legs 44 as shown in FIG. 1. Addditional angle plates 45 may be welded at the lower ends of the legs 40 and 44, and the feet may be secured to spacer plates 47.

Each cylinder 12 is carried by a rigid bracket 50 secured to the disc 36, as by means of screws 52 (FIGS. 1 and 2).

The turret may be driven in any desired fashion, and in the present case a pulley 54 is mounted on the overhung end of shaft 14. This pulley is driven by a motor and belt. The rotation might be made intermittent, with a dwell for discharge and filling, but it is entirely feasible to drive the turret continuously at slow speed. In the machine here shown the entire treatment takes place in one rotation of the turret, and therefore the rotation is necessarily slow. In consequence the discharge and loading are readily accomplished without interruption or dwell. However, even a slow rotation, particularly when the cylinders are in the conical array here shown, produces a tumbling and relative motion of the beads which discourages them from sticking together.

The pellets are first treated with steam to heat and expand them, and then with air, preferably heated air, to dry them. This requires a control or valve system. The actuator 18 requires a compressed air valve system to time its operation. In the machine here shown the disc 36 is used as a large rotating valve element, which turns relative to stationary arcuate elements, to control the supply of steam, hot air and compressed air.

In FIG. 2 the disc 36 has a steam pipe connection 60 leading to the inner end of cylinder 12. It also has a hot air pipe connection 62 leading to the outer end of cylinder 12. The connection 60 is at one radius on disc 36, and the connection 62 is at a different radius, in this case a smaller radius. It will be understood that there are pipes like 60 and 62 for each of the cylinders 12, and that all of the pipes 60 are connected to disc 36 at one radius, and all of the pipes 62 at the same smaller radius.

Referring now to FIG. 3, there is a stationary steam supply passageway indicated at 64, and this is arcuate in configuration, and is located at the proper radius for communication with the steam supply pipes (60 in FIG. 2). There is also a hot air supply passageway 66 which is arcuate in configuration at a smaller radius, suitable for communication with the hot air supply pipes (62 in FIG. 2). It will be seen in FIG. 3 that the steam passageway 64 is angularly displaced from the hot air passageway 66, so that the hot air treatment for drying follows the steam treatment for expansion (the rotation being clockwise).

The passageways 64 and 66 could be formed in arcuate members, but preferably are formed in complete annular members shown at 68 and 70, respectively. These are supported on the circular bearing and valve plate 42 (FIG. 2) by a series of preferably adjustable and resiliently yieldable mounting studs. In the present case the ring 68 is supported by six such studs 72 (FIG. 3), while the ring 70 is supported by four such studs 74.

The fragmentary section in FIG. 2 is assumed to be at an angle, to reveal the channel shaped passageways. Only one stud, the lowermost stud 75, is shown in section. The stud position may be adjusted by rotation of the threaded stud, and the adjustment may be locked by a locknut 77. A similar adjustable construction may be used for all of the stud assemblies. Each assembly has a slidable part and a compression spring to urge the valve ring against the disc 36.

The actuator 18 may be controlled by a similar valve arrangement, and referring to FIG. 2 it will be seen that compressed air pipe 22 is connected to the rotating turret disc 36 at a third radius, while compressed air pipe 20 leading to the other end of the actuator is connected to disc 36 at a fourth radius. Here again there are as many pipes as there are actuators and cylinders, and all of the pipes 22 are connected to the disc at the same third radius, and all of the pipes 20 are connected at the same fourth radius.

Reverting now to FIG. 3, there is a long arcuate compressed air supply passageway 76 at the third radius for supplying air to that end of the actuator which closes its cylinder, and there is a short arcuate compressed air supply passageway 78 at the fourth radius for supplying air to the other end of the actuator for opening its cylinder. The arcuate passageway 76 occupies almost all of its annular member 80, while the short passageway 78 is effective only for the discharge of the expanded beads. In the present case this takes place just ahead of the topmost position of the cylinder.

Immediately thereafter, the actuator attempts to close the cylinder, but at the loading zone this closure is only partially accomplished, it being arrested by the filler spout 30, as shown in FIG. 2. However, as the turret continues its rotation, and after the cylinder has been charged with pellets, the closure is moved away from the filler spout, and the closing of the cylinder is then completed. The valve control of the actuator is simplified in the present case by limiting it to opening and closing of the cylinder, with the intermediate loading position established by simply mechanically obstructing the closing movement for a brief period during which the filling operation takes place.

For this purpose the measuring cup 34 is turned 180° to dump its load at the instant that the cylinder is beneath the spout, and this may be accomplished automatically in different ways, as by use of a limit switch which is contacted by a camming projection on the turret, and which then operates a solenoid to turn the measuring cup 34. In another form, the closure may touch a limit switch on the spout 30, for the same purpose.

The discharge of the pre-expanded beads from the cylinder may be handled quite simply by the provision of a suitable chute, shown at 84 in FIG. 2. The upper end of the chute is disposed beneath the upper end of the cylinder when the cylinder is in discharge position, and it will be recalled that the piston 24 moves all the way to the outer end of the cylinder when the cylinder is fully opened, thereby insuring complete discharge of the expanded beads.

If desired, the supply of steam to the cylinder may be made intermittent instead of continuous. This is sometimes preferred for additional agitation of the beads. For this purpose it is merely necessary to make the arcuate steam passageway (64 in FIG. 3) an intermittent one instead of a continuous one as there shown. This is illustrated in FIG. 5 in which the face of the steam passageway 86 is interrupted or bridged at intervals, as shown at 88. Behind the bridges the passageway may be continuous.

The steam connection from pipe 60 is shown at the bottom of FIG. 4, and preferably the final steam inlet is a constricted passageway 90, so that the live steam is admitted as a jet which tends to agitate the beads, as well as fill the entire cylinder. The hot air connection shown at 92 is preferably a large diameter connection, for free admission of air supplied at a low or "blower" pressure.

When steam is admitted the cylinder may be kept under pressure for part or all of the steam treatment time. If, however, it be desired to flow the steam through the cylinder, this may be accomplished by venting the steam through what is normally the hot air supply pipe. Referring to FIG. 3, there is an arcuate passageway 100 which may extend through part, or as here shown, through the entire angle occupied by the steam passageway 64 previously described. However, the radius of the arcuate passageway 100 corresponds to that of the hot air supply passageway 66.

The arcuate passageway 100 is preferably vented through a pipe 102, and an adjustable valve 104. By closing the valve 104 the action is as though there were no passageway 100, and the cylinder is subjected to steam under some pressure. This of course is most economical in the use of steam. By opening the valve 104 steam is permitted to flow through the cylinder, and the rate of flow may be controlled by appropriately adjusting the valve 104. The arcuate passageway 100 may be subdivided into two or more shorter passageways, each with its own venting valve, and in such case the pellets may be subjected first to steam under pressure, and later to moving steam flowing through the cylinder.

In similar fashion the hot air treatment for drying the beads may be either static or under continuous flow. In the case of hot air it is more important to use a flow than it is in the case of steam. For air flow the venting may be through the pipe normally used for steam supply, and and in FIG. 3 there is an arcuate passageway 106 occupying the same arc as the hot air passageway 66 previously described, but at the radius of the steam passageway 64. If desired, the passage 106 may be vented through a pipe 108 controlled by an adjustable valve 110. In this way the rate of flow of hot air through the cylinder may be adjusted as desired.

The actuator necessarily is vented in order not to obstruct the desired movement of the actuator piston. For this reason there is a vented passageway 112 having the radius of passageway 76 and having the short arc of cylinder opening passageway 78. Passageway 112 is vented to the atmosphere at 114. Theoretically the ring 80 could simply be interrupted between the ends of passageway 76, but for mechanical reasons it is preferred to maintain a continuous sliding contact on a continuous ring, and it is therefore preferred to provide a vented passageway 112, as shown.

In similar fashion there is a venting passageway 116 which has the radius of the cylinder opening passageway 78, and the arc of the cylinder closing passageway 76. The long venting passageway 116 is vented to the air, and a number of openings may be provided for this purpose. In the present case a single opening is shown at 118.

The speed of rotation of the turret is preferably variable through a wide range, so that the time of treatment of the pellets may be varied. This may be done by means of a variable speed motor, or by means of a variable speed drive. In the present case the drive is schematically illustrated as using an electric motor 120 (FIG. 2) driving a variable speed drive 122, the output shaft 124 of which carries a pulley 126 driving a belt 128 and the pulley 54 of the turret shaft 14. The motor 120 may be a reduction gear motor for slow speed output. The ratio in drive 122 may be controlled, as by crank wheel shown at 123.

There are stationary pipe connections for steam, hot air, and compressed air. These connections are not shown in FIGS. 1 and 2, but in FIG. 3 there is a compressed air pipe 126 with connections at 128 and 130; a hot air pipe 132 with a connection at 134; and a steam pipe 136 with a connection at 138. The steam connection leads to the passageway 64; the hot air connection leads to the passageway 66; and the compressed air connection leads to the passageways 76 and 78.

In the particular case here shown, each cylinder has a diameter of six inches, and an effective length of nine inches, with a volume of approximately 247 cubic inches. The actual cylinder length is 10¼ inches and the stroke of the actuator is 9½ inches. The angle of the cylinder relative to the turret shaft axis is 40°.

The valve arrangement is such that steam is admitted for about 200° of rotation, and hot air for the succeeding 100° of rotation. In the 30° arc ahead of the topmost point of the turret there is neither steam nor hot air supply, this region being kept available for discharge of the expanded beads. Similarly, in the 30° arc following the topmost point there is neither steam nor hot air supply, this zone being kept available for charging the cylinder with unexpanded pellets. The zone of compressed air feed to open the cylinder, that is the arc 78 in FIG. 3, comprises approximately the 30° zone ahead of the topmost point. The compressed air supply passageway 76 to close the cylinder occupies substantially the remaining 330° of arc.

It is believed that the construction and method of operation of our improved pre-expander, as well as the advantages thereof, will be apparent from the foregoing detailed description. The frusto-conical turret may rotate on a vertical axis, instead of a horizontal axis, or on an axis disposed at an angle. The turret need not be frusto-conical. It may be cylindrical, with its axis tilted in order to tilt the cylinders. The turret may be a tilted wheel of radial cylinders. The discharge and loading need not be at the top. They preferably are adjacent but need not be. As an extreme example the turret could be loaded at the top and emptied at the bottom, using only a half revolution.

It will therefore be apparent that while we have shown and described the invention in a preferred form, changes may be made in the structure shown, without departing from the scope of the invention as sought to be defined in the following claims.

We claim:

1. A pre-expander for pellets of plastic material, said pre-expander comprising a cylinder which is open at one end, a closure for that end, a piston slidable in said cylinder and acting as a movable bottom, a rod connecting said piston and closure for movement in unison, means operatively associated with said cylinder for heating the interior thereof to expand the pellets of plastic material, and an actuator having a rod connected to said piston and closure assembly to move the same between an intermediate open position for receiving a charge of unexpanded pellets, a closed position in which the pellets are treated to expand the same, and a protruded position in which the piston is moved to the open end of the cylinder to discharge the expanded pellets from the cylinder.

2. A pre-expander for pellets of plastic material, said pre-expander comprising a cylinder which is open at one end, a closure for that end, a piston slidable in said cylinder to act as a bottom, a rod connecting said piston and closure for movement in unison, a first flow connection to the cylinder for supplying steam, a second flow connection to the cylinder for supplying air, and an actuator having a rod connected to said piston and closure assembly to move the same between an intermediate open position for receiving a charge of unexpanded pellets, a closed position in which the pellets are treated with steam and then with air, and a protruded position in which the piston is moved to the open end of the cylinder to discharge the expanded beads from the cylinder.

3. A pre-expander according to claim 2 including means operatively associated with said second flow connection and responsive to flow of steam to said cylinder through said first flow connection for venting said second flow connection during the flow of steam to said cylinder for permitting steam to flow through said cylinder and out of said second flow connection.

4. A pre-expander according to claim 2 including means operatively associated with said first flow connection and responsive to air flow to said cylinder through said second flow connection for venting said first flow connection to said cylinder during air flow to the cylinder for permitting the air to flow through the cylinder and out of said first flow connection.

5. A pre-expander for pellets of plastic material, said pre-expander comprising a rotatable turret of cylinders, each of said cylinders being open at one end, a closure for the open end of each of said cylinders, a piston slidable in each of said cylinders and acting as a bottom therefor, means connecting the piston and closure in each of said cylinders for bodily movement in unison, means operatively associated with each of said cylinders for heating the interior thereof to expand the pellets of plastic material, and actuator means connected to said piston of each of said cylinders and operable in timed relation to the rotation of said turret for moving the piston and closure between a closed position wherein the open end of the cylinder is closed for expansion of the pellets, a protruded position for discharge of the expanded pellets from the cylinder, and an intermediate open position for receipt of a charge of unexpanded pellets.

6. A pre-expander according to claim 5 including control means operatively connected to said actuator means and responsive to rotation of said turret for controlling said actuator means to maintain said piston and closure of each cylinder in closed position during a major portion of each revolution of the turret and for actuating said actuator means to move said piston and closure of each cylinder to the protruded position and then to the intermediate open position during the remaining minor portion of each revolution of the turret.

7. A pre-expander according to claim 5 including a stationary filler means located adjacent said turret and operatively associated with the open ends of said cylinders for successively dispensing a charge of expanded pellets of plastic material into the cylinders when said pistons and closures are in said intermediate open position.

8. A pre-expander for pellets of plastic material comprising a rotatable turret of cylinders, each of said cylinders being open at one end thereof, a closure for the open end of each of said cylinders, a piston slidably mounted in each of said cylinders and acting as a bottom therefor, a rod interconnecting said piston and closure of each of said cylinders for bodily movement thereof in unison, means operatively associated with each of said cylinders for heating the interior thereof to expand the pellets, air actuator means operatively connected to each of said pistons to move the piston and closure of each of said cylinders between a closed position wherein the open end of the cylinder is closed, a protruded position for discharging the expanded pellets from the cylinder, and an intermediate open position for receipt of a charge of unexpanded pellets into the cylinder, a disc rotatable with said turret and having first valve means therein at a first radius and second valve means therein at a second radius, first air pipe connections leading from said first valve means in said discs to said air actuator means for controlling the movement of the pistons and closures from the protruded position to the intermediate open position and then to the closed position, second air pipe connections leading from said second valve means in said discs to said actuator means for controlling movement of the pistons and closures from the closed position to the protruded position, a long arcuate compressed air supply passageway communicating with said discs at said first radius for communication with said first valve means and said first air pipe connections for supplying air to said actuator means to move the pistons and closures to the intermediate open position and then to the closed position, a short arcuate compressed air supply passageway communicating with said disc at said second radius for communication with said second valve means and said second air pipe connections for supplying air to said actuator means to move the pistons and closures to the protruded position, said arcuate passageways for said actuator means being angularly disposed from each other for sequential movement of the pistons and closures between the various positions and said long arcuate air supply passageway corresponding to a major portion of a revolution of said turret and said short arcuate air supply passageway corresponding to a minor portion of a revolution thereof.

9. A pre-expander for pellets of plastic material according to claim 8 wherein said turret is rotatable about a generally horizontal axis and said cylinders are disposed with the open ends thereof outermost, said minor portion of each revolution of said turret during which said piston and closure of each cylinder is moved to protruded position is immediately forwardly of the top of said turret, and including a stationary filler spout located at the top of the turret and positioned so as to overlie the open end of each of said cylinders when said closure is in the intermediate open position for dispensing a charge of unexpanded plastic pellets into said cylinders, said spout being so disposed relative to the open end of the cylinder at the top of the turret to initially obstruct movement of the closure from the protruded position to the closed position to thereby hold the closure in the intermediate open position during the filling of the cylinder.

10. A pre-expander for pellets of plastic material comprising a rotatable turret of cylinders, each of said cylinders being open at one end thereof, a closure for the open end of each of said cylinders, a piston slidably mounted in each of said cylinders and acting as a bottom therefor, means interconnecting said piston and closure of each of said cylinders for bodily movement in unison, actuator means operatively connected to each of said pistons for moving the piston and closure of each of said cylinders between a closed position for expansion of the pellets of plastic material, a protruded position for discharging the expanded pellets from the cylinders, and an intermediate open position for receipt of a charge of unexpanded pellets, a disc rotatable with the turret and having valve means therein for each of said cylinders, steam pipe connections leading from said valve means in said discs to said cylinders, and a stationary arcuate steam supply passageway communicating with said disc at said valve means for communication with the steam pipes connected thereto for supplying steam to the interior of the cylinders for expanding the pellets of plastic material adapted to be received therein.

11. A pre-examiner for pellets of plastic material comprising a rotatable turret of cylinders, each of said cylinders being open at one end thereof, a closure for each of said cylinders, a piston slidably mounted in each of said cylinders and acting as a bottom therefor, means interconnecting said piston and closure of each of said cylinders for bodily movement in unison, actuator means operatively connected to each of said pistons for moving the pistons and closures connected thereto between a closed position for closing the open end of the cylinders, a protruded position for discharge of expanded pellets from the cylinders, and an intermediate open position for receipt of a charge of unexpanded pellets in said cylinders, a disc rotatable with said turret and having first valve means therein at a first radius and second valve means therein at a second radius, steam pipe connections leading from said first valve means in said disc to said cylinders, air pipe connections leading from said second valve means in said discs to said cylinders, a stationary arcuate steam supply passageway communicating with said disc at said first radius for communication with said first valve means and the steam pipes connected thereto, and a stationary arcuate air supply passageway communicating with said disc at said second radius for communication with said second valve means and the air pipes connected thereto, said steam and air supply passageways being angularly displaced from each other so that the air is delivered to said cylinders following the delivery of steam thereto.

12. A pre-expander according to claim 11 including means operatively associated with said air pipe connections and responsive to flow of steam to said cylinders for venting said air pipe connections to permit steam to flow through said cylinder and out of said air pipe connections, and means operatively associated with said steam pipe connections and responsive to flow of air to said cylinders for venting said steam pipe connections to permit air to flow through said cylinders and out of said steam pipe connections.

13. A pre-expander for pellets of plastic material comprising a rotatable turret of cylinders, each of said cylinders being open at one end thereof, a closure for the open end of each of said cylinders, a piston slidably mounted in each of said cylinders and acting as a bottom therefor, means interconnecting said piston and closure of each of said cylinders for bodily movement in unison, actuator means operatively connected to each of said pistons for moving the piston and closure of each of said cylinders between a closed position for expansion of the pellets of plastic material, a protruded position for discharging the expanded pellets from the cylinders, and an intermediate open position for receipt of a charge of unexpanded pellets, a disc rotatable with the turret and having first valve means therein at a first radius, second valve means therein at a second radius, third valve means therein at a third radius and fourth valve means therein at a fourth radius, steam pipe connections leading from said first valve means in said disc to said cylinders, hot air pipe connections leading from said second valve means in said disc to said cylinders, first compressed air pipe connections leading from said third valve means in said disc to one side of said actuator means for operating said actuator means to move said pistons and closures of said cylinders from the protruded position to the intermediate open position and then to the closed position, second compressed air pipe connections leading from said fourth valve means in said disc to the other side of said actuator means for operating said actuator means to move said pistons and closures of said cylinders from the closed position to the protruded position, a stationary arcuate steam supply passageway communicating with said disc at said first radius for communication with said first valve means and the steam pipe connections connected thereto for supplying steam to the interior of said cylinders for expanding the pellets of plastic therein, a stationary arcuate hot air supply passageway communicating with said disc at said second radius for communication with said second valve means and the hot air pipe connections connected thereto for supplying hot air to the interior of said cylinders for drying the pellets of plastic material, said steam and hot air supply passageways being angularly displaced from each other so that the steam for expanding the pellets is delivered to the cylinders prior to the delivery of hot air thereto for drying the expanded pellets, a first stationary arcuate compressed air supply passageway communicating with with said disc at said third radius for communication with said third valve means and the first compressed air pipe connections connected thereto, and a second stationary arcuate compressed air supply passageway communicating with said disc at said fourth radius for communication with said fourth valve means and the second compressed air pipe connections connected thereto, said first and second arcuate compressed air supply passageways being angularly displaced from each other for sequential movement of the pistons and closures between the various positions.

14. A pre-expander according to claim 13 wherein said first arcuate compressed air supply passageway is a long passageway and corresponds to a major portion of a revolution of said turret so that said pistons and closures are maintained in the closed position for a major portion of each revolution of the turret, and wherein said second arcuate compressed air supply passageway is a short passageway and corresponds to the remaining minor portion of each revolution of the turret so that said pistons and closures are moved to the open position during the remaining minor portion of each revolution of the turret.

15. A pre-expander according to claim 13 wherein said cylinders are arranged in frusto-conical relation with the open ends thereof disposed at the base of the conical relation and the actuator means is disposed at the apex of the conical relation, said turret being rotatable about a horizontal axis, and said second arcuate compressed air passageway corresponds to the top portion of each revolution of each of the cylinders so that said cylinders are in the protruded and intermediate open positions at the top of the turret, and including a stationary filler spout located at the top of the turret and positioned so as to overlie the open end of each of said cylinders when said closure thereof is in the intermediate open position for dispensing a charge of unexpanded plastic pellets into said cylinder, said spout being so disposed relative to the open end of the cylinder at the top of the turret to initially obstruct movement of the closure from the protruded position to the closed position to thereby hold the closure in the intermediate open position during filling of the cylinder.

16. A pre-expanded according to claim 13 including means operatively associated with said hot air pipe connections and responsive to flow of steam through said steam pipe connections for venting said hot air pipe connections during the flow of steam to said cylinder for permitting the steam to flow through the cylinder and out of said hot air pipe connections, and means operatively associated with said steam pipe connections and responsive to hot air flow to said cylinder for venting said steam pipe connections during hot air flow to the cylinder for permitting the hot air to flow through the cylinder and out of said steam pipe connections.

17. A pre-expander for pellets of plastic material comprising a turret of cylinders disposed in frusto-conical relation and rotatable about a horizontal axis, each of said cylinders being open at one end thereof and having the open ends thereof at the base of the conical relation, a closure for the open end of each of said cylinders, a piston slidably mounted in each of said cylinders and acting as a bottom therefor, means interconnecting said piston and closure of each of said cylinders for bodily movement in unison, actuator means disposed at the apex of the conical relation of the cylinders and being operatively connected to each of said pistons for moving the pistons and closures between a closed position for closing the open ends of the cylinders for expansion of the pellets of plastic material, a protruded position for discharge of expanded pellets from the cylinders, and an intermediate open position for receipt of a charge of unexpanded pellets in said cylinders, a disc rotatable with said turret and having first valve means therein at a first radius, second valve means therein at a second radius, third valve means therein at a third radius, and fourth valve means therein at a fourth radius, steam pipe connections leading from said first valve means in said disc to said cylinders for supplying steam to the interior of said cylinders for expansion of the pellets of plastic material, hot air pipe connections leading from said second valve means in said disc to said cylinders for supplying hot air to the interior of said cylinders for drying the pellets of plastic material, first compressed air pipe connections leading from said third valve means in said disc to one side of said actuator means for moving said pistons and closures of said cylinders from the protruded position to the intermediate open position and then to the closed position, second compressed air pipe connections leading from said fourth valve means in said disc to the other side of said actuator means for moving the pistons and closures of said cylinders from the closed position to the protruded position, a stationary arcuate steam supply passageway communicating with said disc at said first radius for communication with said first valve means and the steam pipe connections connected thereto, a stationary arcuate hot air supply passageway communicating with said disc at said second radius for communication with said second valve means and the hot air pipe connections connected thereto, said arcuate steam and air supply passageways being angularly displaced from each other for delivery of steam to said cylinders for expansion of the pellets of plastic material and then delivery of hot air to said cylinders for drying of the expanded pellets, a first stationary arcuate compressed air supply passageway communicating with said disc at said third radius for communication with said third valve means and said first compressed air pipe connections connected thereto, said first arcuate compressed air supply passageway having a length corresponding to a major portion of each revolution of said turret beginning at the top of said turret and extending for a major portion of a revolution of the turret, a second stationary arcuate compressed air supply passageway communicating with said disc at said fourth radius for communication with said fourth valve means and said second compressed air pipe connections connected thereto, said second arcuate compressed air supply passageway being of a shorter length than said first arcuate compressed air supply passageway and corresponding to the remaining minor portion of each revolution of said turret, said arcuate steam supply passageway and said arcuate air supply passageways being arranged relative to said first arcuate compressed air supply passageway so that steam and hot air are delivered to said cylinders while the same are closed, and a stationary filler spout located at the top of said turret and positioned so as to overlie the open end of each of said cylinders when the closure thereof is in open position for dispensing a charge of unexpanded plastic pellets into said cylinder, said spout being so disposed relative to the open end of the cylinder at the top of the turret to initially obstruct movement of the closure from the protruded position to the closed position to thereby stop the closure in the intermediate open position and hold the same in this position during filling of the cylinder.

References Cited in the file of this patent

UNITED STATES PATENTS

| | | |
|---|---|---|
| 1,455,975 | Spencer et al. | May 22, 1923 |
| 2,451,301 | O'Connell | Oct. 12, 1948 |
| 2,904,835 | Thomas | Sept. 22, 1959 |
| 2,918,938 | Kimball | Dec. 29, 1959 |
| 2,964,061 | Rawson et al. | Dec. 13, 1960 |

OTHER REFERENCES

Modern Plastics, "Form Molding Goes Automatic," vol. 38, No. 6, February 1961, page 109. (Copy in Sci. Lib.).

UNITED STATES PATENT OFFICE
CERTIFICATE OF CORRECTION

Patent No. 3,155,379.  November 3, 1964

Paul E. Fischer et al.

It is hereby certified that error appears in the above numbered patent requiring correction and that the said Letters Patent should read as corrected below.

Column 8, line 25, for "pre-examiner" read -- pre-expander --; column 10, line 3, for "expanded" read -- expander --.

Signed and sealed this 23rd day of March 1965.

(SEAL)
Attest:

ERNEST W. SWIDER
Attesting Officer

EDWARD J. BRENNER
Commissioner of Patents